United States Patent [19]

Blezard et al.

[11] Patent Number: 5,964,692

[45] Date of Patent: Oct. 12, 1999

[54] FUNCTIONAL FLUIDS AND LIQUID CLEANING COMPOSITIONS AND SUSPENDING MEDIA

[75] Inventors: Michael Blezard, Whitehaven; Michael John Williams, Bridgnorth; Boyd William Grover, Birmingham; William John Nicholson, Halesowen; Edward Tunstall Messenger, Workington; John Hawkins, Cleator Moor, all of United Kingdom

[73] Assignee: Albright & Wilson Limited, West Midlands, United Kingdom

[21] Appl. No.: 08/471,322

[22] Filed: Jun. 6, 1995

Related U.S. Application Data

[62] Division of application No. 08/456,414, Jun. 1, 1995, Pat. No. 5,807,810, which is a continuation of application No. 08/305,794, Sep. 13, 1994, abandoned, which is a continuation of application No. 08/166,810, Dec. 13, 1993, abandoned, which is a continuation of application No. 07/833,890, Feb. 10, 1992, abandoned, which is a continuation-in-part of application No. 07/618,041, Nov. 23, 1990, abandoned, and application No. 07/747,457, Aug. 12, 1991, abandoned, which is a continuation of application No. 07/572,662, Aug. 24, 1990, abandoned.

[30] Foreign Application Priority Data

| Aug. 24, 1989 | [GB] | United Kingdom | 8919254 |
| Aug. 24, 1989 | [GB] | United Kingdom | 8919254 |
| Sep. 28, 1989 | [GB] | United Kingdom | 8926885 |
| Nov. 28, 1989 | [GB] | United Kingdom | 8926885 |

[51] Int. Cl.$^6$ ................................................ B01F 17/00
[52] U.S. Cl. ........................... 516/59; 516/58; 516/76; 516/78
[58] Field of Search ........................................ 252/352

[56] References Cited

U.S. PATENT DOCUMENTS

| 3,254,714 | 6/1966 | Gogarty | 252/309 |
| 3,281,367 | 10/1966 | Jones et al. | 252/112 |
| 3,617,095 | 11/1971 | Lissant | 252/8.554 |
| 3,746,096 | 7/1973 | Zika | 252/8.51 |
| 3,773,110 | 11/1973 | Groves | 166/309 |
| 3,822,746 | 7/1974 | Gogarty | 166/275 |
| 3,899,431 | 8/1975 | Hayes et al. | 252/8.5 P |
| 3,948,782 | 4/1976 | Dreher et al. | 252/851 |
| 3,950,034 | 4/1976 | Dreher et al. | 252/308 |
| 3,950,258 | 4/1976 | Imai et al. | 252/33 |
| 3,953,344 | 4/1976 | Narushima | 252/32.7 E |
| 3,954,627 | 5/1976 | Dreher et al. | 252/851 |
| 4,012,329 | 3/1977 | Hayes et al. | 252/8.5 P |
| 4,018,720 | 4/1977 | Lengyel et al. | 252/534 |
| 4,071,457 | 1/1978 | Meister | 252/8.55 D |
| 4,088,583 | 5/1978 | Pyle et al. | 252/8.51 |
| 4,221,229 | 9/1980 | Dreher et al. | 137/13 |
| 4,234,437 | 11/1980 | Friberg et al. | 252/62.51 |
| 4,243,549 | 1/1981 | Messenger et al. | 252/355 |
| 4,257,902 | 3/1981 | Singer | 252/18 |
| 4,302,347 | 11/1981 | Straw et al. | 252/116 |
| 4,434,062 | 2/1984 | Oswald et al. | 252/8.554 |
| 4,440,665 | 4/1984 | Mather et al. | 252/356 |
| 4,515,704 | 5/1985 | Akred et al. | 252/135 |
| 4,534,875 | 8/1985 | Rose | 252/71 |
| 4,579,668 | 4/1986 | Messenger | 252/851 |
| 4,588,032 | 5/1986 | Weigand et al. | 166/291 |
| 4,596,662 | 6/1986 | Walker et al. | 252/8.5 C |
| 4,618,446 | 10/1986 | Haslop et al. | 252/135 |
| 4,659,497 | 4/1987 | Akred et al. | 252/135 |
| 4,692,271 | 9/1987 | Messenger et al. | 252/354 |
| 4,753,754 | 6/1988 | Messenger et al. | 252/354 |
| 4,781,849 | 11/1988 | Biresaw et al. | 252/495 |
| 4,793,943 | 12/1988 | Haslop et al. | 252/135 |
| 4,822,510 | 4/1989 | Madison et al. | 252/95 |
| 4,871,467 | 10/1989 | Akred et al. | 252/135 |
| 5,039,451 | 8/1991 | Phillips et al. | 252/356 |
| 5,198,353 | 3/1993 | Hawkins et al. | 435/188 |
| 5,807,810 | 9/1998 | Blezard et al. | 507/103 |

FOREIGN PATENT DOCUMENTS

| 0 171 999 | 2/1986 | European Pat. Off. |
| 0255161 | 2/1988 | European Pat. Off. |
| 960 921 | 3/1957 | Germany |
| 24 37 877 | 2/1975 | Germany |
| 24 57 887 | 6/1975 | Germany |
| A-721594 | 1/1955 | United Kingdom |
| 1243559 | 8/1971 | United Kingdom |
| A-1 452 025 | 10/1976 | United Kingdom |
| A-1 479 155 | 7/1977 | United Kingdom |
| 2022125 | 12/1979 | United Kingdom |
| 2084225 | 4/1982 | United Kingdom |
| 2160244 | 12/1985 | United Kingdom |
| A-2 160 244 | 12/1985 | United Kingdom |
| WO 85/03083 | 7/1985 | WIPO |
| WO 88/02434 | 4/1988 | WIPO |

OTHER PUBLICATIONS

"Composition and Properties of Oilwell Drilling Fluids", Gray & Darley Gulf Publishing Co., Fourth Edition, pp. 528–529.

Gray et al, Composition and Properties of Oil Well Drilling Muds (Houston, Gulf Publishing Co., 1980) pp. 528–529 TN 871.2 G 695.

Primary Examiner—Ellen M. McAvoy
Attorney, Agent, or Firm—Frishauf, Holtz, Goodman, Langer & Chick, P.C.

[57] ABSTRACT

Aqueous structured surfactants, e.g., lamellar, or preferably spherulitic systems optionally containing suspended solids are used as functional fluids, such as drilling fluids, cutting fluids, hydraulic fluids, heat transfer fluids, construction muds and lubricants. A composition consisting essentially of: water; a surfactant or mixture of surfactants present in a concentration sufficient to form a mobile spherulitic or dispersed lamellar phase in the absence of an electrolyte; and a substantially water insoluble functional material, suspended in the composition, the composition being substantially free from electrolyte.

21 Claims, No Drawings

FUNCTIONAL FLUIDS AND LIQUID CLEANING COMPOSITIONS AND SUSPENDING MEDIA

CROSS-REFERENCES TO RELATED APPLICATIONS

This is a division of application Ser. No. 08/456,414, filed Jun. 1, 1995, now U.S. Pat. No. 5,807,810, which is a continuation of Ser. No. 08/305,794, filed Sep. 13, 1994 (abandoned), which is a continuation of application Ser. No. 08/166,810 filed Dec. 13, 1993 (abandoned), which is a continuation of application Ser. No. 07/833,890 filed Feb. 10, 1992 (abandoned), which is a CIP of 1) application Ser. No. 07/618,041 filed Nov. 23, 1990 (abandoned), and 2) application Ser. No. 07/747,457 filed Aug. 12, 1991 (abandoned), which is a continuation of Ser. No. 07/572,662 filed Aug. 24, 1990 (abandoned).

BACKGROUND OF THE INVENTION

Field of the Invention

The present invention relates to functional fluids, including lubricants, especially drilling fluids and cutting fluids, as well as more conventional lubricants for bearings, gears, machinery, and the like, hydraulic fluids, and heat transfer fluids.

The present invention also relates to liquid media, which are capable of suspending particulate solids or dispersed liquids or gases and which are especially useful as cleaning compositions.

The invention is also applicable, for example, to the formulation of liquid dishwashing compositions, hard surface cleaners, coal/water slurries and phosphate free laundry detergents and also provides suspending media for other solids such as pesticides, explosives, pigments, ceramics, catalysts or pharmaceuticals.

Definitions

The following terms in quotation marks are used herein in the sense hereafter defined unless a contrary meaning is stated or required by the context.

"Functional Material" means any substantially water insoluble solid, liquid or gas which is to be suspended in an aqueous composition in order to perform a useful function when the composition is used. Examples of functional materials include water insoluble builders such as zeolites, silicone antifoam oils, solid pesticides, ceramics, catalysts, pigments, liquified or compressed gases for use as foaming agents, coal and pharmaceuticals.

"Surfactant" is an organic compound having a hydrophilic and a hydrophobic portion, which substantially lowers the surface energy of a water/oil interface when present in relatively low concentrations. "Surfactant", as used herein, includes not only such conventional surfactants as $C_{6-20}$ alkyl benzene sulphonates, alkyl sulphates, alkyl ethoxylates and alkyl trimethylammonium salts, but also such amphiphilic compounds as $C_{6-20}$ fatty alcohols and fatty acids which are not normally classed as surfactants an account of their low solubility, when the latter are solubilized by the presence of a cosurfactant.

$M_1$ phase: Typically when a surfactant mixture having a composition corresponding to the active ingredients used in the invention is prepared in aqueous solutions of increasing concentration, the molecules are first found to associate in spherical clusters (micelles), which with increasing concentrations become rod-like. At higher concentrations the micelles become more crowded causing a rise in the viscosity of the solution and, in the great majority of cases, eventually lengthen to form a regular hexagonal array of cylindrical surfactant micelles in an aqueous medium (the rigid "$M_1$" liquid crystal phase). If the concentration of a surfactant in the "$M_1$" phase is progressively increased a phase change occurs to give either a hydrated solid phase, or, in the case of surfactant mixtures of this invention, to convert the $M_1$ phase progressively to a fluid "G" phase until a viscosity minimum is reached. Further increase in the concentration of the "G" phase causes the viscosity to rise until a further phase change occurs. This may lead to the formation of either a hydrated solid or a second immobile liquid crystal phase (the $M_2$ phase) which resembles the $M_1$ phase in structure, but inverted—i.e. with water as the internal phase and the surfactant as the continuous phase.

"Drilling Fluid" is used herein to refer to fluids used in the drilling of bore holes in rock to lubricate and cool drill bits, to transport rock cuttings away from the rock face. The term is also used herein to include "Spacer Fluids", which are used to clean the sides of bore holes prior to cementing. Drilling Fluids are used in the construction of deep wells and bore holes, and especially oil and gas wells. For convenience the term Drilling Fluid as used herein also embraces "Construction Muds", which are used in civil engineering and the construction industry to stabilise holes and excavations by preventing the breakdown of shales on exposure to water.

"Shaping" means any process for altering the shape of a solid workpiece by means of a tool, in which friction is generated, including drilling, cutting, grinding, boring, reaming, bending, stamping, pressing, hammering and the like.

"Cutting Fluid" is used herein to refer to fluids used in the Shaping of workpieces, especially in the metal working industries, which lubricate and cool drill bits, and cutting, grinding, and other Shaping tools, including lathes, saws, drills, stamps, presses, broaches, reamers, grindstones and the like.

"Lubricant" means, generally, a fluid which reduces friction between moving surfaces and specifically includes Cutting Fluids, Drilling Fluids, and lubricating fluids for bearings, gears, machinery, hinges and sliding surfaces.

"Heat Transfer Fluid" means a fluid which is used to transfer heat from a warmer to a cooler surface, or to store heat.

"Hydraulic Fluid" means a fluid which transmits pressure and/or kinetic energy in a hydraulic machine or device, such as hydraulic powered machinery, hydraulic brakes and control systems, shock absorbers and fluidic logic circuits.

"Functional Fluid" as used herein means a Lubricant, Heat Transfer Fluid or Hydraulic Fluid.

"Electrolyte" is used herein to denote those ionic compounds which dissociate at least partially in aqueous solution to provide ions, and which at the concentrations present tend to lower the total solubility (including micellar concentration) of surfactants in such solutions by a "salting out" effect. References herein to the Electrolyte content or concentration refer to the total dissolved Electrolyte, including any dissolved Functional Material, if such material is also an Electrolyte, but excludes any suspended solid.

"Substantially free from Electrolyte" means containing insufficient Electrolyte to destabilise the suspension. Typically this implies compositions containing less than 0.5%, preferably less than 0.2% e.g. less than 0.1% by weight, based an the weight of the composition, of Electrolytes added as such, other than any "tramp" electrolyte unavoidably present in the surfactant, or In the suspended Functional Material or any dissolved portion of the suspended solid. "Substantially insoluble" means having a solubility in water less than 2% by weight at 20° C., in the case of ionisable compounds or less than 20% preferably less than 10% e.g. less than 5% in the case of non-ionic compounds.

"Micelle" refers to a particle, which is either spherical or rod shaped, formed by aggregation of the surfactant molecules and having a radius less than twice the mean length of the surfactant molecules. The molecules in a Micelle are typically arranged such that their hydrophillic ("head") groups lie on the surface of the Micelle and the lipophillic ("tail") groups are in the interior of the Micelle.

"Bilayer" includes a layer of surfactant approximately two molecules thick, which is formed from two adjacent parallel layers, each comprising surfactant molecules which are disposed such that the lipophillic (hydrophobic) portions of the molecules are located in the interior of the Bilayer and the hydrophilic portions are located on its outer surfaces. "Bilayer" is also used herein to include interdigited layers, which are less than two molecules thick. An interdigited layer may be regarded as a Bilayer in which the two layers have interpenetrated allowing at least some degree of overlap between the tail groups of the molecules of the two layers.

"Spherulite" means a spherical or spheroidal body having dimensions of from 0.1 to 50 microns. Spherulites may sometimes be distorted into prolate, oblate, pear or dumbell shapes. "Vesicle" means a Spherulite containing a liquid phase bounded by a Bilayer. "Multiple Vesicle" means a Vesicle which contains one or more smaller Vesicles. The Spherulites present in structured surfactant systems are typically concentric Multiple Vesicles.

"Lamellar Phase" means a hydrated solid, or liquid crystal phase in which a plurality of Bilayers are arranged in a substantially parallel array of indefinite extent, separated by layers of water or an aqueous solution, and having a sufficiently regular lattice spacing of from 25 to about 150 nm to be readily detectable by neutron scattering or X-ray diffraction when present as a substantial proportion of a composition. As used herein the expression excludes concentric Multiple Vesicles.

"G" phase refers to a liquid crystal Lamellar Phase, of the type also known in the literature as "neat" phase or "lamellar" phase. The "G" phase for any given surfactant or surfactant mixture normally exists in a narrow range of concentrations. Pure "G" phases can normally be identified by examination of a sample under a polarising microscope, between crossed polarisers. Characteristic textures are observed in accordance with the classic paper by Rosevear, JAOCS Vol. 31 P628 (1954) or in J. Colloid and Interfacial Science, Vol. 20 No. 4, P.500 (1969). "G" phases normally exhibit a repeat spacing of from 50 to 70 nm, in X-ray diffraction or neutron scattering patterns. "Expanded G phase" means a "G" phase with a repeat spacing of 110 to 150 nm.

"Spherical G Phase" means Multiple Vesicles formed from substantially concentric shells of surfactant Bilayer alternating with aqueous phase with a "G" phase or Expanded G phase spacing. Typically conventional G phases may contain a minor proportion of Spherical G Phase.

"Lye" means an aqueous liquid phase containing Electrolyte, which phase separates from, or is Interspersed with, a second liquid phase containing more Active Ingredient and less Electrolyte than the Lye phase.

"Lamellar Composition" means a composition in which a major part of the surfactant is present as a Lamellar Phase, or in which a Lamellar Phase is the principal factor inhibiting sedimentation.

"Spherulitic Composition" means a composition in which a major part of the surfactant is present as spherical G-phase, or which is principally stabilised against sedimentation by a Spherical G-phase. (spherulitic surfactant phase).

"Structured Surfactant" means a fluid composition which has shear dependent viscocity and solid-suspending properties and which comprises a surfactant mesophase, which may optionally be dispersed in, or interspersed with an aqueous phase which is typically a Lye phase. The mesophase may, for example, comprise a G-phase, Spherulites, especially Spherical G-phase, or a Lamellar hydrated solid. "Weighting Agent" means a water insoluble particulate mineral having a specific density greater than 3.5 and preferably greater than 4 e.g. barite or haematite.

"Drilling Mud" is a Drilling Fluid which contains suspended mineral particles, such as rock cuttings and or Weighting Agents.

"Solubility Parameter" is as defined and described in Section VII p. 519 of "The Polymer Handbook".

Background Information

It is a general problem with Functional Fluids that they most commonly comprise mineral oil, which is a potential polutant and fire hazard. Our invention concerns a solution to this problem which entails the use of aqueous Structured Surfactants, which are generally more environmentally acceptable than mineral oils, do not present a fire hazard, and yet may possess equal or superior physical properties and chemical stability.

The invention is of particular importance in the provision of Drilling Muds.

Drilling Fluids in oil wells are normally pumped continuously down the drill stem, through apertures in the drill bit and are then forced up to the surface through the annular space between the drill stem and the side of the hole, carrying the rock cuttings in suspension. At the surface the cuttings are separated from the Drilling Mud and the latter Is then recycled. Prior to cementing the mud is replaced by a Spacer Fluid which transports loose particles from the hole and leaves a clean, water-wet surface to provide a good cement bond.

Certain rocks cause particular problems during drilling or excavation, due to their tendency to disintegrate in the Drilling Fluid to form fines which are very difficult to separate from the fluid and rapidly build up in the recycle stream causing increasing viscosity. Chief among the problem rocks is shale which generally disintegrates in the presence of water.

An acceptable Drilling Fluid needs to have a viscosity which is sufficiently low under conditions of shear to flow readily, but it also has to possess solid suspending properties. To achieve these conflicting requirements a thixotropic fluid is usually required. Moreover it must not cause excessive breakdown of rocks such as shale. If it is to be useful for deep drilling, the fluid must be thermally stable, and it is important that excessive loss of fluid into the formation should be avoided.

Hitherto these requirements have almost always been achieved by using either oil or an oil-in-water emulsion as the Drilling Fluid. The oil coats particles of shale and protects them from contact with water, thereby inhibiting their disintegration. However this in turn creates an environmental problem, especially in offshore drilling operations, when the rock cuttings are discarded. To avoid serious pollution the oil must be cleaned from the cuttings, before they can be dumped. It is difficult and expensive to reduce the oil contamination to currently permitted levels, but even these small amounts of residual oil are ecologically undesirable, and there is pressure to replace oil based drilling fluids altogether.

The alternative of using aqueous solutions containing polymeric suspending agents or dispersants and/or bentonite to suspend the rock cuttings is less environmentally harmful, and may be somewhat cheaper than the use of oil based muds, but only for shallow drilling, and where the formation presents no special problems. For deep drilling or for drilling, or digging, through problem formations such as shale, which is very frequently encountered in oil well drilling and excavation, such cheap aqueous fluids are inadequate. They have insufficient thermal stability to withstand the high temperatures of deep formations and they cause breakdown of the shale. Their lubricity is also generally inferior to that of oil based muds.

Attempts have been made to improve the performance of aqueous Drilling Fluids with a variety of special additives such as polymeric coating agents, and high concentrations of Electrolyte to help stabilise shale. These have substantially increased the cost of the mud, but have not succeeded in providing an aqueous fluid with adequate performance to replace oil based muds for deep drilling. However environmental pressure is increasingly compelling oil companies to adopt relatively expensive and technically inferior water based fluids in place of the conventional oil based muds.

Cutting Fluids are normally applied to metal surfaces to cool and lubricate drill bits and cutting tools, such as saws, lathes, stamps, presses, grindstones, reamers and broaches, and to remove swarf from the work. The Cutting Fluid is normally an emulsion of oil in water, and contains various additives to improve lubricity and prevent wear damage to the surface of the work. One common problem with Cutting Fluids is the prevalence of dermatitis among workers who regularly handle them, due to the additives and/or the oil. The presence of the oil may also be environmentally undesirable. There are similar environmental problems associated with other Functional Fluids, including conventional mineral oil Lubricants and Hydraulic Fluids. These also give rise to a fire hazard.

The art of formulating laundry detergents and similar cleaning preparations is remote from the art of formulating Lubricants and Hydraulic Fluids. The problems to be overcome in the two arts are not generally similar. However, we have noted that liquid cleaning preparation often require the presence of suspended solids. For example hard surface scouring creams require the presence of abrasives and effective laundry detergents require cast effective builders, which may be sparingly soluble or insoluble in water. These problems have been solved (e.g., in the case of scouring creams and liquid laundry detergents) by utilizing the interaction between Electrolytes and surfactants to provide solid suspending structures based on thixotropic dispersions or interspersions of surfactant mesophases with aqueous Electrolyte solutions.

There is also a substantial demand in many fields of activity for fluid systems to disperse a variety of functional materials which may be solid, liquid or gaseous and which are not easily dissolved or dispersed in aqueous media.

GB 2,123,846 describes the use of Lamellar (mesophase) surfactant interspersed with an Electrolyte solution in liquid laundry detergent. A different structure, also referred to in GB 2 123 846, and present, although not specifically identified, in formulations exemplified in a number of other publications, comprises an array of Spherulites, each having a plurality of concentric shells of surfactant alternating with layers of Electrolyte solution. Patent specifications which describe formulations which probably exhibit Spherulitic or Lamellar structure include:

| AU 482374 | GB 855679 | US 2920045 |
| AU 507431 | GB 855893 | US 3039971 |
| AU 522983 | GB 882569 | US 3075922 |
| AU 537506 | GB 943217 | US 3232873 |
| AU 542079 | GB 955081 | US 3235505 |
| AU 547579 | GB 1262280 | US 3281367 |
| AU 548438 | GB 1405165 | US 3328309 |
| AU 550003 | GB 1427011 | US 3346503 |
| AU 555411 | GB 1468181 | US 3346504 |
| CA .917031 | GB 1506427 | US 3351557 |
| CS 216492 | GB 1577120 | US 3509059 |
| DE A1567656 | GB 1589971 | US 3374922 |
| DE 2447945 | GB 2600981 | US 3629125 |
| EP 0028038 | GB 2028365 | US 3638238 |
| EP 0038101 | GB 2031455 | US 3813349 |
| EP 0059280 | GB 2054634 | US 3956158 |
| EP 0079646 | G8 2079305 | US 4018720 |
| EP 0084154 | JP-A-52-146407 | US 4057506 |
| EP 0103926 | JP-A-56-86999 | US 4107067 |
| FR 2283951 | SU 498331 | US 4169817 |
| | SU 922066 | US 4265777 |
| | SU 929545 | US 4279785 |
| | | US 4299740 |
| | | US 4302347 |

Although in mast instances the structures which would have been present in the formulations as described were insufficiently stable to maintain solids in suspension. GB 2153 380 and U.S. Pat. No. 4,618,446 describe the Spherulitic structure and methods for preparing a close packed, space filling, structure, sufficiently robust to withstand various forms of shear and temperature stress, but sufficiently mobile to be readily poured. The method requires optimizing Electrolyte concentrations within close limits.

All the foregoing art requires the presence of substantial concentrations of electrolyte, typically around 12%, in order to form a stable supporting structure by interaction with the surfactant.

This does not necessarily represent a problem in formulations where the presence of electrolytes Is desired to achieve particular performance criteria e.g. in phosphate, carbonate and/or silicate built detergents.

However the need to incorporate electrolytes represents a significant restriction on the ability to prepare stable formulations for a variety of special purposes for which electrolytes are undesirable. It is known that some surfactants form mobile lamellar mesophases in the absence of electrolyte. The preparation of 'G' phases from certain surfactants and surfactant mixtures has been described, for example in GB 1538 199, GB 1488352, GB 1533 851, GB 2021 141, GB 2013 235, GB 2031 941, GB 2023 637 AND GB 2022 125. In all of these references a lamellar mesophase is formed by a surfactant or mixture of surfactants in the absence of electrolyte within a narrow range of concentrations. Attempts to suspend effective quantities of solid particles, such as builders, in lamellar ("G") mesophases is described in the foregoing references have resulted in the formation of immobile pastes.

In pending British Patent Application No. 89 06234.3 there is described the use of Structured Surfactants for the support of pesticides.

Pending British Patent application No. 8919254 describes ways of obtaining a solid suspending surfactant structure in substantially Electrolyte-free systems.

Prior art Functional Fluids including oil based Drilling Muds and Lubricants have contained minor proportions of surfactants as emulsifying agents for the oil or as dispersants for sludge. The surfactants have typically been present essentially as monolayers surrounding colloidal size droplets or particles of oil or dispersed solid. The protection of shale in Drilling Muds has been essentially due to the shale being coated with oil. The suspending properties and thixotropic character of oil based Drilling Mud has been provided by the interaction of the dispersed oil droplets. In the case of oil-free muds, the protection of the shale has been provided by the presence of polymers which encapsulate the rock particles irreversibly and are therefore consumed quantitatively when the rock is separated. The solid suspending properties are provided by polymeric thickeners such as sodium carboxymethyl cellulose or methacrylates. These tend to stabilise the suspension at the expense of the mobility of the fluid.

Electrolytes have been used in both oil based and water based Drilling Mud to control the water activity. If the concentration of the Electrolyte is sufficiently high to reduce the water activity of the mud to the same level as that of the shale, hydration of the latter will not occur. However, if the water activity of the mud is too low the shale will tend to dehydrate and become brittle and if it is too high it will tend to hydrate and disintegrate, unless there is some protective barrier between the shale and the aqueous medium. Unfortunately it is not possible consistently to maintain the Electrolyte at the optimum level because the mineral strata contain soluble salts which tend to dissolve in the mud altering the Electrolyte content as it passes through the hole.

SUMMARY OF THE INVENTION

We have now discovered that aqueous Structured Surfactants have surprisingly good lubricity for both rock and metal, even under extreme pressure conditions and in the absence of extreme pressure additives. In addition, such Structured Surfactants exhibit the rheological characteristics required for a Drilling Fluid or Hydraulic Fluid and also the ability to suspend solid rock cuttings, or swarf and, surprisingly, they protect shale against disintegration, even in the total absence of any oil or protective polymer. We believe that the shale is protected by a coating of surfactant. The fluid is easily separated from rock cuttings and any residual surfactant can easily be washed from the cuttings with water. The clean cuttings present no ecological hazard and may be safely dumped. The aqueous surfactant is a Structured Surfactant such as those formed by the interaction of surfactant with dissolved Electrolyte, preferably a Spherulitic system. Typically it comprises a surfactant/water mesophase interspersed with an aqueous or aqueous Electrolyte continuous phase.

An important and particularly surprising characteristic of the Spherulitic compositions when used as Drilling Fluids is the low fluid loss into the formation, which is significantly lower than with conventional Drilling Fluids, even without additives which are normally required. The Structured Surfactants can readily be formulated in a heat stable form for high temperature applications such as deep drilling.

In our invention both suspending properties and protection of shale are provided essentially by the surfactant, preferably in conjunction with some dissolved Electrolyte. While we do not wish to be limited thereby, we believe that the surfactant may coat shale particles reversibly. It may also help to maintain an optimum water activity. The surfactant is preferably present in our composition as spherical G-phase, dispersed Lamellar phase or Micelles.

Generally our invention provides the use of aqueous, Structured Surfactants as, or in, Functional Fluids.

According to one embodiment our invention provides the use of Structured Surfactants as, or in, Hydraulic Fluids.

According to a second embodiment our invention provides the use of Structured Surfactants as, or in, Heat Transfer Fluids.

According to a third embodiment our invention provides the use of Structured Surfactants to reduce friction between moving surfaces.

According to the latter embodiment our invention includes a method of lubricating bearing surfaces, gears and the like which comprises applying thereto an aqueous Structured Surfactant.

In particular our invention provides a method of drilling bore holes or of Shaping metal or other workpieces which comprises using as Drilling Fluid or Cutting Fluid an aqueous Structured Surfactant which is preferably a solution containing surfactant Micelles, or interspersed with a Lamellar solid, Spherulitic or G-phase surfactant, in a quantity sufficient to inhibit disintegration of shale or provide wear protection to metal surfaces and to maintain the rock cuttings or swarf in suspension under normal drilling conditions.

According to a further embodiment our invention comprises the use of aqueous Structured Surfactants as, or in, Construction Muds or Spacer Fluids.

According to a further embodiment our invention provides a Functional Fluid comprising an aqueous Structured Surfactant and a corrosion inhibitor dissolved therein.

According to a further embodiment our invention provides a Drilling Mud comprising an aqueous Structured Surfactant which preferably comprises: (A) a continuous aqueous phase, (B) a Lamellar solid, Spherulitic or G-phase surfactant structure interspersed with said aqueous phase; in an amount sufficient to confer solid suspending properties thereon and, (C) suspended solid particles of shale and/or Weighting Agent.

According to a further embodiment, our invention further provides a Cutting Fluid or other Lubricant comprising an aqueous Structured Surfactant and containing wear inhibiting or lubricity promoting additives.

According to a further embodiment our invention provides a Heat Transfer Fluid comprising a particulate solid, having a high specific heat capacity such as ferrophosphorus.

The compositions of our invention preferably contain at least 3%, more usually at least 4%, e.g. at least 5% by weight of surfactants. The surfactants may constitute up to about 35% by weight of the composition, although we prefer on both economic and rheological grounds to use lower concentrations e.g. less than 30%, more usually less than 25%, preferably less than 20%, e.g. 10 to 15% by weight.

We have now discovered that certain surfactants form structured systems, such as spherulitic or dispersed lamellar phases in the substantial absence of electrolyte, which are capable of supporting particulate solids to form mobile suspensions. In particular we have discovered that mixed surfactants having a mean solubility parameter In the range 10 to 12 tend to form spherulitic systems in the absence of added electrolyte and at concentrations typically In the range 8 to 25% by weight.

These suspensions are of value for a variety of applications, such as in automatic dishwashing compositions, hard surface cleaners, phosphate-free laundry detergents and pesticide suspensions.

Our invention therefore provides a composition comprising: water; a surfactant or mixture of surfactants present in a concentration sufficient to form a spherulitic or dispersed lamellar phase in the absence of Electrolyte; and a substantially insoluble functional material, suspended in the composition; said composition being substantially free from Electrolyte.

According to a preferred embodiment the surfactant comprises at least one surfactant with a solubility parameter greater than 13 and at least one surfactant with a solubility parameter below 10, the relative proportions being such as to provide a mean solubility parameter for the mixture between 10 and 13.

In a preferred embodiment the surfactant has a water solubility less than 1 weight % and sufficient cosurfactant to solubilize it to the extent of at least 5 weight %.

DETAILED DESCRIPTION OF THE INVENTION

The surfactant system according to the present invention may be any surfactant, mixture of surfactants or mixture of surfactant and hydrotrope that farms a solid-supporting spherulitic or mobile lamellar phase in the absence of added Electrolyte.

The surfactant may for example consist substantially of an at least sparingly water-soluble salt of sulphonic or mono esterified sulphuric acid, e.g., an alkylbenzene sulphonate, especially the lower (e.g., $C_{1-6}$) amine salts such as isopropylamine $C_{10-14}$ alkyl benzene sulphonate, alkyl sulphate, especially ammonium or lower amine salts, alkyl ether sulphate, olefin sulphonate, alkane (paraffin) sulphonate, ester sulphonate, alkylphenol sulphate, alkylphenol ether sulphate, alkylethanolamide sulphate, fatty alkyl polyethyleneoxy sulphates, fatty alkyl polyethyleneoxy phosphates, alkylethanolamide ether sulphate, or alpha sulpho fatty acid or its esters each having at least one alkyl or alkenyl group with from 8 to 22, more usually 10 to 20, aliphatic carbon atoms. Said alkyl or alkenyl groups are preferably straight chain primary groups but may optionally be secondary, or branched chain groups. The expression "ether" hereinbefore refers to oxyalkylene and homo- and mixed polyoxyalkylene groups such as polyoxyethylene, polyoxypropylene, glyceryl and mixed polyoxyethylene-oxypropylene or mixed glyceryl-oxyethylene, glyceryl-oxypropylene groups, or glyceryl-oxyethylene-oxypropylene groups, typically containing from 1 to 20 oxyalkylene groups. For example, the sulphonated or sulphated surfactant may be sodium dodecyl benzene sulphonate, potassium hexadecyl benzene sulphonate, sodium dodecyl dimethyl benzene sulphonate, sodium lauryl sulphate, sodium tallow sulphate, potassium oleyl sulphate, ammonium lauryl monoethoxy sulphate, or monethanolamine cetyl 10 mole ethoxylate sulphate.

Other anionic surfactants useful according to the present invention include, sulphosuccinates such as fatty alkyl sulphosuccinates or fatty alkyl ether sulphosuccinates, sulpho- succinamates such as fatty alkyl sulphosuccinamates or fatty alkyl ether sulphosuccinamates, acyl sarcosinates, taurides such as acyl taurides, isethionates, soaps such as stearates, palmitates, resinates, oleates, linoleates, rosins soaps and alkyl ether carboxylates and saponins. Anionic phosphate esters including naturally occurring surfactants such as lecithin may also be used. In each case the anionic surfactant typically contains at least one aliphatic hydrocarbon chain having from 8 to 22 preferably 10 to 20 usually an average of 12 to 18 carbon atoms, an ionisable acidic group such as a sulpho-, acid sulphate, carboxy, phosphono- or acid phosphate group, and, in the case of ethers, one or more glyceryl and/or from 1 to 20 ethyleneoxy and/or propyleneoxy groups.

Preferred anionic surfactants are sodium salts. Other salts of commercial interest include those of potassium or lithium, or less preferably calcium or magnesium, but most preferably an ammonium or a primary, secondary, tertiary or quaternary $C_{1-6}$ total alkylammonium such as methylammonium, dimethylammonium, trimethylammonium, tetramethylammonium, or ethylammonium, or monoethanolamine, diethanolamine, triethanolamine and alkyl amines containing up to seven aliphatic carbon atoms, such as isopropylamine and also propylammonium.

The surfactant preferably contains or consists of nonionic surfactants. The nonionic surfactant may be, e.g., a $C_{10-22}$ alkanolamide of a mono or di-lower alkanolamine, such as coconut or tallow monoethanolamide or diethanolamide. Other nonionic surfactants which may optionally be present, include ethoxylated alcohols, ethoxylated carboxylic acids, ethoxylated amines, ethoxylated alkylolamides, ethoxylated alkylphenols, ethoxylated glyceryl esters, ethoxylated sorbitan esters, ethoxylated phosphate esters, and the propoxylated, butoxylated and mixed ethoxy/propoxy and/or butoxy analogues of all the aforesaid ethoxylated nonionics, all having a $C_{8-22}$ alkyl or alkenyl group and up to 20 ethyleneoxy and/or propyleneoxy and/or butyleneoxy groups, or any other nonionic surfactant which has hitherto been incorporated in powder or liquid detergent compositions, e.g., amine oxides. The latter typically have at least one $C_{8-22}$, preferably $C_{10-20}$ alkyl or alkenyl group and up to two lower (e.g. $C_{1-4}$, preferably $C_{1-2}$) alkyl groups, i.e., the surfactant may comprise an amine oxide or alkylated amine oxide.

The preferred nonionics for our invention are for example those having an HLB range of 2–18, e.g., 8–18.

Our compositions may contain cationic surfactants, which include quaternary amines having at least one long chain (e.g., $C_{12-22}$ typically $C_{16-20}$) alkyl or alkenyl group, optionally one benzyl group and the remainder of the four substituents short chain (e.g., $C_{1-4}$) alkyl groups. They also include imidazolines, ethoxylated imidazolines and quaternized imidazolines having at least one long chain alkyl or alkenyl group, and amido amines and quaternized amido amines having at least one long chain alkyl or alkenyl group. The quaternized surfactants are all usually salts of anions which impart a measure of water solubility such as having a carboxylate anion such as formate, acetate, citrate or lactate, or tartrate, a halide such as chloride, fluoride or bromide, methosulphate, ethosulphate, sulphate or nitrate. Especially effective as Lubricants are cationic surfactants having two long chain fatty alkyl, e.g., tallow groups, such as bis tallowyl quaternary ammonium and imidazolinium salts. The surfactant may be a fatty alkyl tris (lower alkyl) ammonium salt (e.g., tallowyl trimethyl ammonium chloride) or benzalkonium salt, e.g., lauryl benzyl benzyl bis methyl ammonium chloride.

Compositions of our invention may also contain one or more amphoteric surfactant, which include betaines, sulphobetaines and phosphobetaines formed by reacting a suitable tertiary nitrogen compound having a long chain alkyl or alkenyl group with the appropriate reagent, such as chloroacetic acid or propane sultone. Examples of suitable tertiary nitrogen containing compounds include:

tertiary amines having one or two long chain alkyl or alkenyl groups and optionally a benzyl group, any other substituent being a short chain alkyl group; imidazolines having one or two long chain alkyl or alkenyl groups and amidoamines having one or two long chain alkyl or alkenyl groups. Generally amphoteric surfactants are less preferred than non-ionic, or anionic, surfactants.

The specific surfactant types described above are only exemplary of the commoner surfactants suitable for use according to the invention. Any surfactant may be included. A fuller description of the principal types of surfactant which are commercially available is given in "Surface Active Agents and Detergents" by Schwartz Perry and Berch.

Generally we prefer that surfactants for use according to our invention should be substantially non-toxic, especially to marine life, we also prefer that the surfactants should be substantially stable at temperatures above 100° C., preferably above 120° C., especially above 150° C. and, e.g. for deep drilling applications, above 180° C.

Dissolved Electrolyte compounds are strongly preferred constituents of our compositions. Although it is possible to prepare Structured Surfactants in the absence of Electrolyte, if the surfactant concentration is sufficiently high, the mobility of such systems is often insufficient unless the surfactant has been selected with great care. Addition of Electrolyte permits the preparation of mobile Structured Surfactants containing relatively low concentrations of surfactant.

Suitable Electrolytes include the water soluble alkali metal, ammonium and alkaline earth metal salts of the strong mineral acids. Particularly preferred are sodium and potassium salts especially the chlorides. However lithium, calcium and magnesium salts may also be present. Among salts that are useful may be included phosphates, nitrates, bromides, fluorides, condensed phosphates, phosphonates, acetates, formates and citrates. It is often particularly convenient, in the case of Drilling Fluids to make up the composition by diluting a surfactant concentrate on site with locally occurring natural brine (e.g. sea water in the case of offshore operations). This may be used to provide all or part of the Electrolyte content of the Drilling Fluid.

The Electrolyte may be present in concentrations up to saturation. Typically the less the amount of surfactant present, the more Electrolyte will be required to form a structure capable of supporting solid materials. We generally prefer to use higher concentrations of Electrolyte and lower concentrations of surfactant, and to select the cheapest Electrolytes on economic grounds. Thus Electrolyte should normally be present in a concentration of at least 0.1% by weight based on the total weight of the composition, more usually at least 0.5% e.g. more than 0.75% preferably more than 1%. Usually the concentration is less than 30% more usually less than 10% e.g. less than 8% by weight. Typically the concentration is between 1% and 5%.

The maximum Electrolyte concentration depends, among other things, on the type of structure, and the viscosity required as well as considerations of cost. We prefer to form Spherulitic compositions as described in our application GB-A-2,153,380 in order to obtain a satisfactory balance between mobility and high load of suspended solids. The optimum concentration of Electrolyte for any particular type and amount of surfactant may be ascertained as described in our aforesaid application by observing the variation of electrical conductivity with increasing Electrolyte concentration until the first conductivity minimum is observed. Samples may be prepared and tested by centrifuging for 90 minutes at 20,000 G, adjusting the Electrolyte concentration to obtain a suspending medium which does not separate into two phases in the centrifuge.

Preferably the Electrolyte concentration is adjusted to provide a composition which is non-sedimenting on standing for three months at ambient temperature, or at 0° C. or 40° C. We particularly prefer compositions which do not show signs of sedimentation or separation into two or more layers after being maintained for 72 hours at 100° C. in an autoclave. Preferably also the Electrolyte content is adjusted to provide a shear stable composition and desirably, one which does not increase viscosity substantially on standing after exposure to normal shearing.

Alternatively sufficient Electrolyte may be added to form a Lamellar system as described in GB-2,123,846, e.g. by adding enough Electrolyte to ensure that the liquid suspending medium separates on centrifuging at 800 G for seventeen hours to form a Lye phase containing little or no surfactant. The amount of water in the formulation may then be adjusted to obtain an optimum balance of mobility and stability.

In the case of Drilling Muds and Spacer Fluids, it is usually desirable to supply to the hole a fluid that contains the necessary concentrations of surfactant and Electrolyte to form a solid-suspending structure. However Electrolyte salts occurring in the rock through which the hole is being drilled may sometimes be capable of forming the structure in situ if only an aqueous surfactant is supplied. It is often preferred to supply an aqueous system containing less than the optimum amount of Electrolyte in order to allow for dissolution of Electrolyte minerals occurring in the hole.

The quantity of Electrolyte required, also depends on the nature and solubility of the surfactant. Generally surfactants with high cloud points need less Electrolyte than surfactants with low cloud point. With some surfactants no Electrolyte is required.

The surfactants or surfactant mixtures that can be used according to the present invention, e.g., in Electrolyte-free compositions according to the present invention, are typically those that form a 'G' phase at ambient temperature, but, preferably, do not form an $M_1$ phase. Generally speaking the aqueous surfactant has a cloud point greater than 30° C., more usually greater than 40° C. and preferably greater than 50° C. Aqueous surfactants having a cloud point above 60° C. are especially suitable. Alternatively or additionally the surfactant may have an inverse cloud point below 30° C., more usually below 20° C., especially below 10° C., preferably below 0° C. Surfactants with an inverse cloud point below –10° C. are especially useful. Inverse cloud points are typical of some nonionic surfactants, in which increasing temperature tends to break the hydrogen bonds responsible for hydration of the hydrophilic part of the molecule, thus rendering it less soluble. Normal cloud points are more typical of anionic or cationic surfactants. Mixtures of anionic and nonionic surfactant may show a cloud point and/or an inverse cloud point.

It is usually preferred that the surfactant should be present in a concentration of at least 1%, e.g., at least 3% by weight of the composition, more usually above 5%, especially above 8% and preferably 10% and above, e.g., 10% to 15%. A typical range of concentrations of the surfactants is from 6 to 15%, more usually 7 to 12% or from 7 to 50%, more usually 10 to 40% and preferably 15 to 30%. Other concentrations of surfactants which may be used are 1–30%, e.g., 2–15% by weight of the composition. It is preferred that the concentration of surfactant should be sufficient, in the presence of any Electrolyte in the formulation to provide compositions with a plastic viscosity as measured on a Fann viscometer of from 5 to 35 cps—that is 0.005 to 0.035 Pa sec preferably from 0.015 to 0.03 e.g. 0.02 to 0.025 Pa sec. We prefer that the composition should have a Yield Point greater than 15 lb/100 ft$^2$ preferably from 30 to 50 especially from 35 to 45 e.g. 40 lb/100 ft$^2$. These Yield Points are approximately equal, respectively, to 7.25. Pa; 14 to 25 Pa; 17 to 22 Pa; and 20 Pa. We particularly prefer that the composition should have a ratio of Yield Point to Plastic Viscocity of from 1 to 2.5 especially 1.5 to 2 e.g. 1.8 expressed in cps and lb/100 ft$^2$ respectively. These ratios correspond approximately to: 50 to 120; 70 to 95; 85 expressed in SI units.

Concentrations of surfactant above 60% are possible but very unlikely to be commercially viable at least for the majority of foreseeable uses of the invention.

Particularly preferred in Electrolyte-free systems are non-ionic and mixed nonionic surfactants, especially mixtures of fatty alcohol ethoxylates and mixtures of fatty alcohol ethoxylates with fatty acid ethoxylates or mixed ethoxylated/propoxylated alcohols and fatty acids ethoxylates. For example mixtures comprising one or more $C_{10}$ to $C_{20}$ average fatty alcohols and or fatty acids alkoxylated with from 5 to 15 ethyleneoxy and/or propyleneoxy groups, are especially useful. Other non-ionic surfactants which may be used include alkoxylated alkylphenols, alkoxyated amines, alkoxylated sorbitan or glycerol esters of fatty acids, and alkanolamides such as coconut mono- or di-ethanolamide and mixtures thereof.

Typically when a surfactant is to be used which has a Solubility Parameter greater than 12 it should be mixed with a surfactant having a solubility parameter less than 11 and vice versa, the relative proporations being selected such that the mean solubility parameter of the mixture is between 10 and 13, preferbly between 11 and 12.

A particular feature of the invention is the ability to utilise compounds which on account of their low solubility in water are not usually effective as surfactants and are not usually classified as such but which are useful surfactants in the presence of cosurfactants which may then be used to form spherulitic compositions. Typically such compounds are amphiphiles having a hydrophobic group such as an alkyl, alkenyl or alkaryl group comprising 6 to 22 aliphatic carbon atoms and a polar group such as a hydroxyl, carboxyl, carbonyl, ester, amino, benzylamino, alkylamino, pyridine, amido, nitro, cyano or halo group. Typical examples are fatty alcohols such as octyl, lauryl, cetyl or stearyl alcohol, fatty acids such as decanoic, lauric, stearic, coconut, palmitic or behenic acids, unsaturated acids such as oleic, linoleic or linolenic acids, phenols such as nonyl phenol, halides such as p-chloro-dodecyl benzene, ketones such as dodecyl cyclohexanone, aldehydes such as octanal, amines such as coconut fatty amine, dodecyl dimethylamine, glycerides such as olive oil or glyceryl disterarate and heterocyclics such as 4-lauryl pyridine. Typically the amphiphile is less than 1% by weight soluble in water, e.g. less than 0.5% especially less than 0.2% eg. less than 0.1%.

The suspended material may, for example, comprise a water insoluble detergent builder such as a zeolite or a particulate ion exchange resin, an inert abrasive such as calcite, talc or a substantially water insoluble pesticide, catalyst, ceramic, pharmaceutical or pigment or a silicone oil, or substantially water insoluble gas. The particle size is not usually critical. Typically particles of from 1 to 10 microns may be suspended e.g. 5 to 70 micron especially 10 to 50 micron.

The solid may be present in any concentration from 2%, to 85% but preferably 10% to 60% especially 15% to 40%.

The surfactant is preferably present in a sufficient concentration to form a stable spherulitic phase. Some surfactants form stable spherulitic structures at concentrations in the range 4 to 20% others require higher concentration in the range 25 to 50% by weight. The spherulitic structure comprises closely packed spherulites each of which comprises concentric bilayer shells of surfactant alternating with water. Typically the successive shells have a repeat spacing of 110 to 150 nm. Alternatively the surfactant may form an open expanded lamellar ("G" phase) structure with a similar repeat spacing. Suitable hydrotropes include lower alkyl benzene sulphonate such as sodium toluene sulphonate, sodium xylene sulphonate or sodium cumene sulphonate, a lower molecular weight alcohol (e.g. $C_{4-10}$ alcohol) or alcohol ethoxylate.

Drilling Muds contain suspended solid which may comprise rock cuttings such as shale, and/or may comprise a Weighting Agent such as barite or haematite. The total amount of suspended solid may typically vary from about 5% by weight up to about 60% by weight or more, preferably from 10 to 50% e.g. 35 to 45%.

Preferably sufficient Weighting Agent is included to provide a specific gravity of from 1 to 1.8.

We prefer that the Functional Fluids of our invention should have low foaming properties. While this can be achieved by selecting inherently low foaming surfactants, we may be able to include antifoams such as silicone oil antifoams, phosphate esters, fatty alcohols or, less preferably, hydrocarbon oils. Typically the antifoam is required in concentrations of 0.1 to 5% by weight. The composition may optionally include a suspending agent such as carboxymethyl cellulose or polyvinyl pyrrolidone, usually in amounts up to 5%, e.g.,0.5 to 2% by weight. For reasons of cost and rheology, however, we prefer to avoid the use of such suspending agents.

We prefer that Drilling Muds of our invention are substantially free from oil or organic solvents, either water-miscible solvents such as lower mono or polyhydroxy alcohols, ketones and polyethers or water-immiscible solvents such aromatic hydrocarbons, and also from any hydrotropes such as urea,. benzene sulphonate or lower alkyl benzene sulphonates. Solvents and hydrotropes tend to interfere with surfactant structuring and require the use of substantially increased amounts of surfactant and/or Electrolyte. They also increase the cost of the formulation without generally increasing performance. Oil and solvents are in addition highly undesirable on environmental grounds.

We therefore prefer, if present at all, that oils, solvents and hydrotropes are each present in proportions less than 10%, more preferably less than 5%, most preferably less than 1%, e.g. less than 0.5%, usually less than 0.1% and most commonly less than 0.05% by weight, based on the weight of the composition.

Cutting Fluids and lubricants for bearings, gears and the like, according to our invention may optionally contain minor amounts of mineral or vegetables oils or solid lubricants such as graphite suspended or emulsified in the aqueous Structured Surfactant.

We prefer that polymeric thickening agents such as gums are absent or present in concentrations less than 5%, preferably less than 0.5% since they are not generally necessary to stabilise the compositions and since they increase the cost and viscosity of the suspensions.

Drilling Muds or other Functional Fluids of our invention may optionally contain auxiliary structuring agents such as bentonite but such additions are normally unnecessary to prevent fluid loss and may be detrimental to rheological proprieties. If present, bentonite should preferably not be in excess of 5% by weight of the total composition. However Drilling Fluids of our invention are generally capable of tolerating the presence of bentonite adventitiously derived from minerals in the bore hole.

Drilling Muds may optionally contain suspended graphite to increase lubricity.

The composition may optionally contain a biocide such as glutaraldehyde, or preferably a tetrakis hydroxymethyl phosphonium salt such as THP sulphate or a mixture thereof with glutaraldehyde, to inhibit the growth of sulphate reducing bacteria which may cause corrosion of the pipes, spoilage of the fluid and/or infection of the formation.

Lubricants may contain E.P. additives and all Functional Fluids other invention desirably contain corrosion inhibitors such as phosphite esters, phosphonates, polyphosphonates, chromates and zinc salts. The corrosion inhibitor is preferably an organic chelating agent or other inhibitor of corrosion of metal surfaces by aqueous solutions.

The invention is illustrated by the following examples in which all proportions are by weight based an the total weight of the composition unless stated to the contrary.

| EXAMPLE | 1 | 2 | 3 | 4 | 5 |
|---|---|---|---|---|---|
| AES | 3.2 | 3 | 2.65 | — | — |
| IPABS | 6.4 | 7 | 4.02 | — | — |
| LABS | — | — | — | 10.7 | 10.7 |
| AO | — | — | — | 2.1 | 2.1 |
| DEABS | — | — | — | 2.1 | 2.1 |
| KCl | 1 | — | 1 | 1.2 | 1.0 |
| KA | — | 0.4 | — | — | — |
| Yield Point N m$^{-2}$ | 35.43 | 24.42 | 18.19 | 6.22 | 4.79 |
| Plastic Viscosity (Pas) | 0.015 | 0.043 | 0.021 | 0.025 | 0.02 |
| YP/PV × 10$^{-3}$ | 23.62 | 5.68 | 6.66 | 2.49 | 2.4 |
| Shale recovery at R.T. | 94.8 | 96.2 | 97.8 | 95.8 | 91.2 |
| Shale recovery at 60° C. | — | 92.0 | 93.2 | 91.8 | 87.0 |

AES is a sodium $C_{12}$ to 16 alkyl three mole ethoxy sulphate.
IPABS is isopropylamine $C_{10-14}$ linear alkyl benzene sulphonate
LABS is sodium $C_{10-14}$ linear alkyl benzene sulphonate
AO is $C_{12-16}$ alkyl dimethyl amine oxide
DEABS is diethanolamine $C_{10-14}$ linear alkyl benzene sulphonate
KCl is potassium chloride
KA is potassium acetate Examples 1, 2 and 3 were clear micellar solutions. Examples 4 and 5 were opaque spherulitic compositions.

All five examples were capable of suspending 50 gm barite in 350 ml. at 80° C. for 18 hours.

EXAMPLE 6

A drilling mud was prepared by suspending 1118.7 gm barite in 1500.0 gm of 10% aqueous IPABS. The latter was an opaque spherulitic composition and the mud formed a stable suspension.

EXAMPLE 7

A drilling mud was prepared by suspending 1028.8 g barite and 3 g silicone antifoam in 1500 g of an aqueous spherulitic composition comprising 2.25% diethanolamine, 10.5% LABS and 2.25% amine oxide.

EXAMPLE 8

A drilling mud was prepared by suspending 1094.6 g barite 37.5 g bentonite and 3 g. silicone antifoam in 10% aqueous IPABS.

EXAMPLE 9

A drilling mud suitable far making up offshore using sea water comprises 8% LABS, 8% coconut diethanolamide and 4% sodium chloride.

EXAMPLE 10

The products of Example 5, 7 and 8 were compared with a commercial oil based mud for sedimentation using a slant tube test. A 1 meter 40 mm bore tube containing the test mud at an angle of 45° to vertical was allowed to stand for 120 hours at the end of which period separation of a less opaque phase was visible in the top 35 cm of the oil based mud but no such separation was visible in the samples of the invention.

EXAMPLE 11

The commercial oil based mud was compared with the products of examples 6 and 7 in a low pressure static filtration. This indicates the tendency of the mud to lose fluid to the formation. Results are reported in the following Table 1.

TABLE I

|  | oil based (comparative) | Example 6 | Example 7 |
|---|---|---|---|
| Thickness of filter cake | 1 mm | <1 mm | <1 mm |
| Filtrate discharge | 13.5 ml | 3.6 ml | 1.7 ml |

EXAMPLE 12

The lubricity of the composition described in Example 9 was tested using the FALEX method as described in Institute of Petroleum test method IP 241 69.

A clean metal spindle was rotated between two V blocks under a progressively increasing load, while immersed in the test lubricant, without circulation.

The composition of the invention was compared with three comparative lubricants, namely water, mineral oil and a bentonite suspension. All three comparisons failed (at 500 lbf, 1000 lbf, and 1500 lbf respectively) The composition of the invention in contrast gave excellent lubricity at all loads up to and including the maximum load of 4000 lbf. It was the only lubricant of the four to survive the test without failure.

EXAMPLE 13

Various Structured Surfactants were compared with water, mineral oils and non-structured surfactant solutions in the test of Example 12. The results are set out in Table 2 in which all % are by weight based on the total weight of the mixture. The lubricants are listed in increasing order of performance in the test. Only the last three lubricants survived the whole test without seizure.

TABLE 2

| Lubricant | Coefficient of Friction[1] | Failure |
|---|---|---|
| *i. Water | 0.107 | 7 secs at 750 lbf |
| *ii. Mineral oil containing E.P. additives ("Tellus" R1O) | 0.065 | 44 secs at 750 lbf |
| *iii. Mineral oil containing no additives ("Turbo" T68) | 0.048 | 6 secs at 1250 lbf |
| *iv. 30% LABS (not structured) | 0.050 | 45 secs at 1500 lbf |
| v. Example 1 of GB 2123846 (Lamellar structure) | 0.048 | 54 secs at 1500 lbf |
| vi. 14% LABS 6% OB (Spherulitic) | 0.042 | 13 secs at 200 lbf |
| vii. 10% IPABS (Spherulitic) | 0.038 | 45 secs at 2500 lbf |
| viii. 3% IPABS, 12% AES, 4% NaCl (Spherulitic) | 0.053 | 41 secs at 2750 lbf |
| ix. 12% LABS, 8% AE, 3% NaCl (Spherulitic) | 0.031 | 41 secs at 3500 lbf |
| x. 50% IPABS (G-phase) | 0.024 | 57 secs at 4000 lbf |
| xi. 8% LABS, 8% coconutdiethanolamide, 4% NaCl (Spherulitic) | 0.024 | 51 secs at 4250 lbf |
| xii. 8% LABS, 8% coconutdiethanalamide, 4% NaCl 2% graphite (Spherulitic), | 0.027 | 51 secs at 4250 lbf |
| xiii. 20% LABS, 10% coconutdiethanolamide (Spherulitic) | 0.026 | Na failure at 4500 lbf |
| xiv. 3% LABS, 12% IPABS, 2% NaCl (Spherulitic) | 0.026 | Na failure at 4500 lbf |
| xv. 25% imidazoline[2] (Spherulitic) | 0.020 | Na failure at 4500 lbf |

*comparative example
[1] coefficients of friction are as measured immediately prior to failure/conclusion of test.
[2] 1-methyl, 1-tallowamidoethyl, 2-tallowyl imidazolinium methosulphate.

EXAMPLE 14

A typical mineral oil based hydraulic fluid has a flash point of 103° C. None of the examples of the invention described herein exhibited a measurable flash point.

EXAMPLE 15

Compositions according to examples 13 (xiii) and 13 (xiv) above may be used as cutting oils in a machine shop.

They are sucessfully used in place of conventional cutting oils, on drills, lathes and saws, giving smooth Shaping of the metal with reduced scoring or other damage to the work, and extended life of drill bits and blades.

EXAMPLE 16

An automatic dishwashing composition comprises:

| | % wt/wt |
|---|---|
| Lauric acid 9 mole ethoxylate | 6.6 |
| cetyl/oleyl alcohol 6 mole ethoxylate | 13.3 |
| "WESSALITH" P (Trademark) zeolite | 20 |
| perfume | 0.1 |
| silicone antifoam | 0.2 |
| water | balance |

The product is a pourable, non-sedimenting composition with good dishwashing performance and low foaming characteristics.

EXAMPLE 17

An abrasive hard-surface cleaner comprises:

| | % wt/wt |
|---|---|
| cetyl/oleyl alcohol 6 mole ethoxylate | 6.6 |
| lauric acid 9 mole ethoxylate | 1.4 |
| "DURCAL" 15 (Trademark) calcite | 50 |
| perfume | 0.1 |
| water | balance |

The product is a pourable, non-sedimenting cream with good scouring and cleaning properties.

EXAMPLE 18

A coal/water slurry comprises:

| | % wt/wt |
|---|---|
| cetyl/oleyl alcohol 6 mole ethoxylate | 2 |
| lauric acid 9 mole ethoxylate | 1 |
| powdered coal | 75 |
| water | balance |

The product was a non-sedimenting pumpable slurry.

EXAMPLE 19

A pesticide suspension comprises:

| | % wt/wt |
|---|---|
| isopropylamine C$_{10-14}$ alkylbenzene sulphonate | 10 |
| phenmedipham | 20 |
| water | balance |

The product is a pourable non-sedimenting composition.

EXAMPLE 20

A pesticide suspension comprises:

| | % wt/wt |
|---|---|
| "EMPICOL" 0216 (Trademark) alkyl ethoxy phosphate ester | 10 |
| phenmedipham | 20 |
| water | balance |

The product is a pourable, non-sedimenting composition.

EXAMPLE 21

A pesticide suspension comprises:

| | % wt/wt |
|---|---|
| "EMPICOL" 0216 (Trademark) alkyl ethoxy phosphate ester | 10 |
| mandeb | 20 |
| water | balance |

The product is a pourable, non-sedimenting composition.

EXAMPLE 22

Mixtures of lauryl alcohol, triethanolamine dodyecyl benzene sulphonate and water formed spherulitic suspending media at concentrations between 5 and 22% total surfactant and weight ratios of sulphonate to alcohol greater than 4.8:6.2.

EXAMPLE 23

Mixtures of water, olive oil and isopropylamine secondary C$_{12}$ alkyl benzene sulphonate formed spherulitic suspending systems at concentrations between 9 and 21% total surfactant and weight ratios of sulphonate to olive oil greater than 4.5:6.5.

EXAMPLE 24

Mixtures of water, octanol and triethanolamine C$_{12}$ linear alkyl benzene sulphonate formed spherulitic suspending systems at total surfactant concentrations of 5 to 20% by weight and ratios of sulphonate to octanol greater than 5.8 to 4.2.

EXAMPLE 25

Mixtures of water, oleic acid and triethanolamine C$_{12}$ linear alkylbenzene sulphonate at a total surfactant concentration greater than 12% by weight and a weight ratio of sulphonite to acid between 4.5:5.5 and 7:3 formed spherulitic suspending media.

We claim:

1. A composition consisting essentially of:
   (a) water; (b) a surfactant component comprising a surfactant or a mixture of surfactants present in a concentration sufficient to form a mobile spherulitic or dispersed lamellar phase in the absence of electrolyte, said spherulitic or dispersed lamellar phase being operable to support a substantially water insoluble functional material in suspension; and (c) said substantially water insoluble functional material in an amount of from 2% to 85% by weight, suspended in the composition,
   said composition being substantially free from added electrolyte whereby said composition contains less than 0.5% by weight of said added electrolyte.

2. The composition as claimed in claim 1, wherein said surfactant forms a "G" phase at ambient temperature, but not an M$_1$ phase.

3. The composition as claimed in claim 1, wherein the mixture of water and surfactant has a cloud point above 30° C.

4. The composition as claimed in claim 3, wherein a mixture of surfactant and water has a cloud point greater than 40° C.

5. The composition according to claim 1, wherein a mixture of surfactant and water has an inverse cloud point below 30° C.

6. The composition according to claim 5, wherein a mixture of surfactant and water has an inverse cloud point below 10° C.

7. The composition according to claim 1, wherein the surfactant is present in a concentration greater than 5% by weight of the composition.

8. The composition according to claim 7, wherein the surfactant is present in a proportion of from 7 to 50% by weight of the composition.

9. The composition according to claim 7, wherein the surfactant comprises one or more C$_{10}$ to C$_{20}$ average fatty alcohols alkoxylated with from 5 to 15 ethylenoxy and/or propyleneoxy groups.

10. The composition according to claim 7, wherein the surfactant comprises a C$_{1-6}$ amine C$_{10-14}$ alkyl benzene sulphonate.

11. The composition according to claim 10, wherein said C$_{1-6}$ amine is isopropylamine or triethanolamine.

12. The composition according to claim 1, wherein said surfactant component comprises a mixture of surfactants having a mean solubility parameter between 10 to 13.

13. The composition according to claim 12, wherein said surfactants have a mean solubility parameter between 11 and 12.

14. The composition according to claim 1, said surfactant component comprises a mixture of a surfactant having a solubility parameter greater than 12 and a surfactant having a solubility parameter less than 11.

15. The composition according to claim 1, wherein said surfactant component comprises a surfactant having a water solubility less than 1% by weight and sufficient cosurfactant to solubilize it to the extent of at least 5% by weight.

16. The composition of claim 1, wherein said functional material is selected from the group consisting of zeolites, silicone antifoam oils, solid pesticides, ceramics, catalysts, pigments, liquified or compressed gases for use as foaming agents, coal and pharmaceuticals.

17. The composition of claim 16, wherein the functional material is a suspended solid having a particle size of 1 to 100 microns.

18. The composition of claim 17, wherein the functional material is present in an amount of 10 to 60%.

19. The composition of claim 18, wherein the functional material is present in an amount of 15 to 40%.

20. The composition of claim 1 containing less than 0.2% by weight of said added electrolyte.

21. The composition of claim 1 containing less than 0.1% by weight of said added electrolyte.

* * * * *